(12) United States Patent
Jones et al.

(10) Patent No.: US 6,280,653 B1
(45) Date of Patent: *Aug. 28, 2001

(54) LIQUID CRYSTAL COMPOSITION AND LIQUID CRYSTAL SHUTTER

(75) Inventors: John Clifford Jones; Andrew John Slaney, both of Malvern (GB)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/154,557

(22) Filed: Sep. 16, 1998

(30) Foreign Application Priority Data

Sep. 17, 1997 (GB) .................................................. 9719822

(51) Int. Cl.⁷ .......................... C09K 19/12; C09K 19/34; G02F 1/13
(52) U.S. Cl. ................................ 252/299.61; 252/299.66; 349/2
(58) Field of Search ........................ 252/299.61, 299.66; 349/2

(56) References Cited

U.S. PATENT DOCUMENTS

| | | | |
|---|---|---|---|
| 4,594,465 | * | 6/1986 | Chan et al. ........................... 568/642 |
| 4,892,393 | * | 1/1990 | Terashima et al. ................... 349/183 |
| 4,923,632 | * | 5/1990 | Sawada et al. ................... 252/299.61 |
| 5,106,531 | * | 4/1992 | Murashiro et al. ............. 252/299.61 |
| 5,232,624 | * | 8/1993 | Reiffenrath et al. ............ 252/299.61 |
| 5,705,095 | * | 1/1998 | Bartmann et al. .............. 252/299.66 |
| 5,762,828 | * | 6/1998 | Tanaka et al. .................. 252/299.63 |
| 5,772,914 | * | 6/1998 | Pauluth et al. ..................... 252/299.6 |
| 5,800,737 | * | 9/1998 | Chan ............................... 252/299.66 |
| 5,948,319 | * | 9/1999 | Tanaka et al. .................. 252/299.66 |

FOREIGN PATENT DOCUMENTS

| | | |
|---|---|---|
| 0332025 | 9/1989 | (EP) . |
| 0399298 | 11/1990 | (EP) . |
| 9516760 | 6/1995 | (WO) . |

* cited by examiner

Primary Examiner—Shean C. Wu
(74) Attorney, Agent, or Firm—Renner, Otto, Boisselle, and Sklar, LLP

(57) ABSTRACT

A liquid crystal composition comprising (1) an achiral host mixture comprising (a) at least 20% by weight, based on the total weight of the host mixture, of a mixture of fluorinated phenylpyrimidine compounds capable of exhibiting an SmC phase, and (b) at least 10% by weight, based on the total weight of the host mixture, of at least one fluorinated terphenyl compound which enhances the phase sequence of said mixture, wherein the total amount of (a) and (b) is at least 50% by weight based on the total weight of the host mixture; and (2) at least one chiral dopant in an amount of not more than 10% by weight of the total weight of the composition.

23 Claims, 1 Drawing Sheet

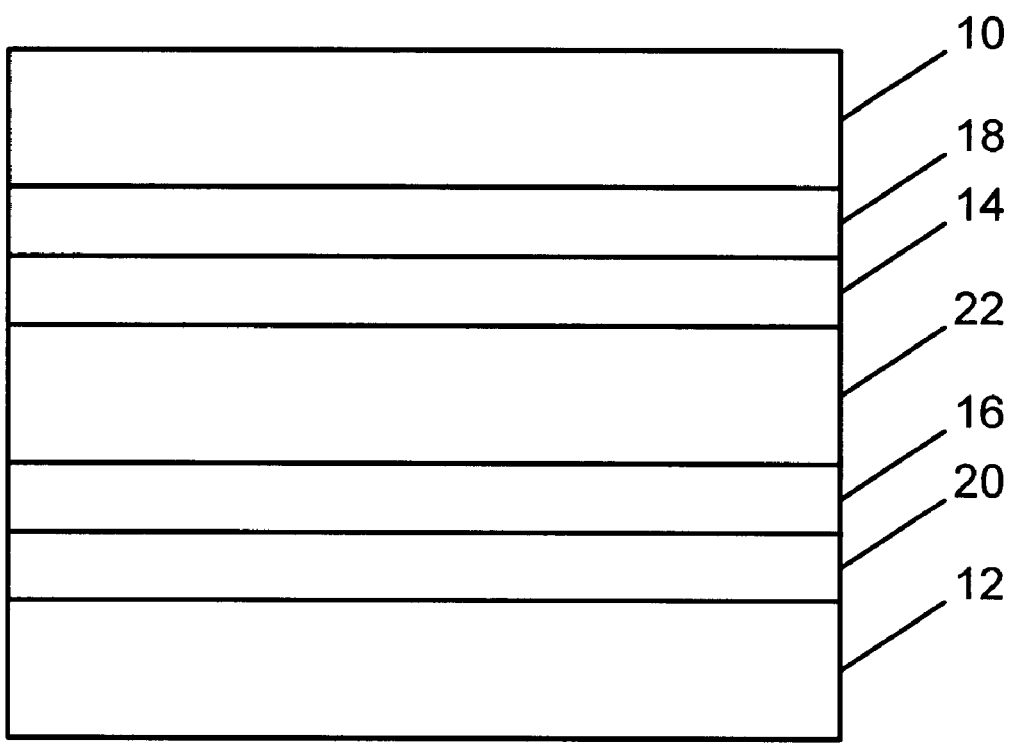

LIQUID CRYSTAL COMPOSITION AND LIQUID CRYSTAL SHUTTER

BACKGROUND OF THE INVENTION

The present invention relates to a liquid crystal composition and a liquid crystal shutter arrangement containing such a composition, for example a liquid crystal display device including a multiplicity of liquid crystal shutters.

Liquid crystal devices including ferroelectric liquid crystal compositions are the subject of active research interest. It is particularly required for there to be a good contrast ratio between the switched states of the liquid crystal device. In this regard, the bistable nature of these devices, and the switching properties and memory angle ($\theta_m$) thereof are important. The memory angle ($\theta_m$) is half the angular difference between the optic axes of the two latched orientation states of the liquid crystal molecules and is optimally 22.5°, which is difficult to achieve in practice. A target value of greater than 15° is advantageous. The required alignment of the molecules within the liquid crystal layer results from appropriate treatment of substrates on opposite sides of such layer. The liquid crystal layer is formed by introducing the liquid crystal composition at an elevated temperature so as to cause it to be in the isotropic, free flowing, phase into a narrow gap (the cell gap) between the substrates. At this stage, the liquid crystal composition is at a temperature somewhat higher than its operating temperature.

The liquid crystal composition is then cooled in a controlled manner until an optically active tilted smectic phase is achieved, typically the smectic C phase, SmC*, (the * denotes chirality or optical activity). In order for the liquid crystal composition to have the required advantageous properties, it is desired for it to pass from the isotropic phase (I) through chiral nematic (N*) and smectic A (SmA) phases before reaching the operative smectic C* phase. This is referred to as an I-N*-SmA-SmC* phase sequence. These phases must be of acceptable width (greater than about 2° C. wide).

Liquid crystal compositions commonly comprise a host material such as those based on mixtures of two or more fluorinated phenylpyrimidinyl compounds exhibiting or capable of exhibiting a smectic C phase and, optionally, other materials (phase sequence enhancers) which may be included to modify the properties of the host material, for example to impart chirality if the host material is not inherently chiral, or to induce or enhance formation of certain phases so as to result in the required phase sequence.

U.S. Pat. No. 5,232,624 and EP-A-0332025 disclose a wide variety of chiral 1,2-difluorobenzene derivatives for imparting chirality in achiral smectic liquid crystal host mixtures. In one particular example, there is described the addition of 10% of a chiral dopant, ethyl 2-[4-(4'-nonyloxy-2',3'-difluorobiphenyl4-yl)phenoxy] propionate, to a host mixture which consists mostly of unfluorinated phenylpyrimidine compounds and phenyl-substituted thiadiazoles but which contains minor proportions of two difluorinated phenylpyrimidines and a difluorinated biphenylpyrimidine.

SUMMARY OF THE INVENTION

It is an object of the present invention to provide a liquid crystal composition which can have advantageous switching properties, a high memory angle and a good contrast ratio in a suitable device.

According to the present invention, there is provided a liquid crystal composition comprising (1) an achiral host mixture comprising (a) at least 20% by weight, based on the total weight of the host mixture, of at least two fluorinated phenylpyrimidine compounds capable of exhibiting an SmC phase, and (b) at least 10% by weight, based on the total weight of the host mixture, of at least one fluorinated terphenyl compound which enhances the phase sequence of said mixture, wherein the total amount of (a) and (b) is at least 50% by weight based on the total weight of the host mixture; and (2) at least one chiral dopant in an amount of not more than 10% by weight of the total weight of the composition.

Preferably, (a) is present in an amount of at least 30% by weight based on the total weight of the host mixture.

The total amount of (a) and (b) is preferably 50 to 98% by weight, and more preferably 60 to 95% by weight, based on the total weight of the host mixture.

The fluorinated phenylpyrimidine compounds are preferably difluorinated phenylpyrimidine compounds, particularly those which are difluorinated on the phenyl rings. Such compounds preferably fall within the following general formula [I]:

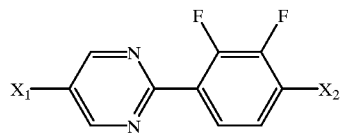

wherein $X_1$ and $X_2$ are usually independently selected from the group consisting of ($C_1$–$C_{12}$)alkyl and ($C_1$–$C_{12}$)alkoxy, more preferably ($C_5$–$C_{10}$)alkyl and ($C_5$–$C_{10}$)alkoxy, and most preferably ($C_7$–$C_9$)alkyl and ($C_7$–$C_9$)alkoxy. The alkyl groups are preferably linear. However, it is also within the scope of the present invention for either or both of $X_1$ and $X_2$ to be selected from ($C_2$–$C_{12}$)alkenyl, ($C_2$–$C_{12}$)alkenyloxy, ($C_1$–$C_{12}$)alkoxycarbonyl, ($C_2$–$C_{12}$)alkenyloxycarbonyl, ($C_1$–$C_{12}$)alkanoyl, ($C_2$–$C_{12}$)alkenoyl and ($C_2$–$C_{12}$)ether groups, whereof the carbon chain lengths are preferably ($C_5$–$C_{10}$), and most preferably ($C_7$–$C_9$). It is also within the scope of the invention for either or both of $X_1$ and $X_2$ to be at least partially fluorinated.

Such fluorinated phenylpyrimidinyl compounds will sometimes be referred to for convenience under the designation "FPYP". Thus "diFPYP" designates compounds of the formula [I] above. Also for convenience, the lengths of the alkyl chains in $X_1$ and $X_2$ will be given by reference to the number of carbon atoms. Thus, for example, 8.O9diFPYP designates a compound of the formula [I] where $X_1$ is the alkyl group $C_8H_{17}$ and $X_2$ is the alkoxy group $OC_9H_{19}$, and 9O.8diFPYP designates a compound of the formula [I] where $X_1$ is the alkoxy group $C_9H_{19}O$ and $X_2$ is the alkyl group $C_8H_{17}$. In this designation, the substituent group X which is on the fluorinated ring is positioned adjacent "diF".

The mixture of fluorinated phenylpyrimidinyl compounds may comprise at least two diFPYP compounds wherein (i) $X_1$ and $X_2$ in at least one diFPYP compound are both ($C_1$–$C_{12}$)alkoxy, for example ($C_7$–$C_{10}$)alkoxy, and (ii) one of $X_1$ and $X_2$ in at least one other diFPYP compound is ($C_1$–$C_{12}$)alkyl, preferably ($C_7$–$C_9$)alkyl and the other of $X_1$ and $X_2$ is ($C_1$–$C_{12}$)alkoxy, preferably ($C_7$–$C_9$)alkoxy. It is preferred for these compounds (i) and (ii) to be present in a mutual weight ratio of about 1:4 to 4:1.

The fluorinated terphenyl compound is preferably a difluorinated compound, more preferably one in which the fluorine groups are adjacent substituents on one of the phenyl rings. The fluorinated terphenyl compound preferably has the general formula [II], [III], [IV] or [V]:

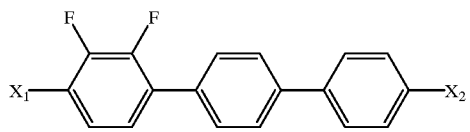

[II]

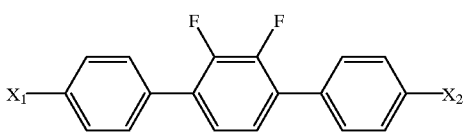

[III]

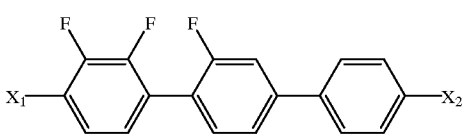

[IV]

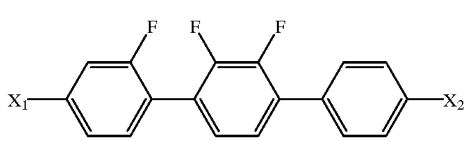

[V]

wherein $X_1$ and $X_2$ are as defined above.

Such fluorinated terphenyl compounds will sometimes be referred to for convenience under the designation "FTP". Thus "diFTP" designates difluorinated FTP compounds of the formula [II] and/or [III] above, and "triFTP" designates trifluorinated FTP compounds of the formula [IV] and/or [V] above. The same designations as used above for $X_1$ and $X_2$ for FPYP compounds will also be used for the FTP compounds.

The liquid crystal composition may contain one such compound, for example a diFTP wherein both $X_1$ and $X_2$ are $(C_1-C_{12})$alkyl, or it may contain at least two such compounds of the general formula [II] and/or [III]. As an example of this latter type, in at least one of such compounds, $X_1$ is $(C_1-C_{12})$alkoxy and $X_2$ is $(C_1-C_{12})$alkyl and, in at least one other of such compounds, $X_1$ and $X_2$ are both $(C_1-C_{12})$alkyl. Preferably, the alkoxyalkyl compound is present in a lesser amount than the dialkyl compound, the ratio being preferably not more than about 0.5:1.

The liquid crystal composition may further include a fluorinated biphenyl compound which preferably has the formula [VI]:

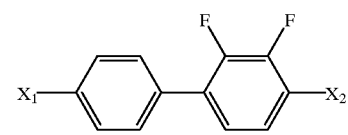

[VI]

Such fluorinated biphenyl compounds will sometimes be referred to for convenience under the designation "FBP". Thus "diFBP" designates difluorinated FBP compounds of the formula [VI] above. The same designations as used above for $X_1$ and $X_2$ for FPYP compounds will also be used for the FBP compounds.

As an example of this, the liquid crystal composition may contain a mixture of (a) at least two diFTP compounds wherein, in at least one of such diFTP compounds, $X_1$ is $(C_1-C_{12})$alkoxy and $X_2$ is $(C_1-C_{12})$alkyl and, in at least one other of such diFTP compounds, $X_1$ and $X_2$ are both $(C_1-C_{12})$alkyl; and (b) a compound of the general formula [VI] wherein one of $X_1$ and $X_2$ is $(C_1-C_{12})$alkoxy and the other of $X_1$ and $X_2$ is $(C_1-C_{12})$alkyl. The compound (b) is preferably present in a smaller amount by weight than the compounds (a).

In the case where the liquid crystal composition containing the above-described compounds is not inherently chiral, where a ferroelectric liquid crystal material is required, it is necessary for there to be at least one chiral dopant, as is per se known in the art. Said at least one chiral dopant may be used in an amount of about 1.2 to 4.2 wt %, more preferably about 2.7 to 3.3 wt %, based on the total weight of the liquid crystal composition. Typical examples of chiral dopants are:

BE8OF2N

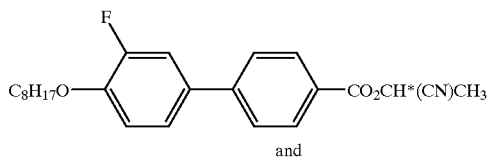

and

IGS97

The liquid crystal composition may further include other additives which are per se known in the art, for example for producing improved phase transitions, birefringence, viscosity and cone angle and memory angle.

Also according to the present invention, there is provided a liquid crystal shutter comprising a pair of mutually spaced substrates upon which are provided respective opposed alignment surfaces which are spaced apart, a layer of liquid crystal composition according to the present invention filling the space between the alignment surfaces, and electrodes to enable a switching voltage to be applied to the liquid crystal layer.

THE BRIEF DESCRIPTION OF DRAWING

The accompanying drawing is a schematic view of a typical liquid crystal optical shutter incorporating a liquid crystal composition according to the present invention.

DETAILED DESCRIPTION OF PREFERRED EMBODIMENTS

Referring to the drawing, the liquid crystal optical shutter comprises a pair of parallel, spaced-apart glass substrates 10 and 12 having alignment layers 14 and 16 on mutually facing inner surfaces thereof. Transparent electrode layers 18 and 20 are provided on the substrates 10 and 12, respectively, and serve to enable a switching voltage to be applied across a layer 22 of liquid crystal composition disposed between and in contact with the alignment layers 14 and 16 to enable the layer 22 to be switched between bistable dark and light states between crossed polarizers in a manner well known per se. Shutters of this type can be employed in a wide variety of liquid crystal display devices.

The present invention will now be described in further detail in the following Examples.

EXAMPLE 1

A basic difluorophenylpyrimidine host material (HM1) was formulated which comprised a 1:1 ratio (by weight) of the following diFPYP compounds:

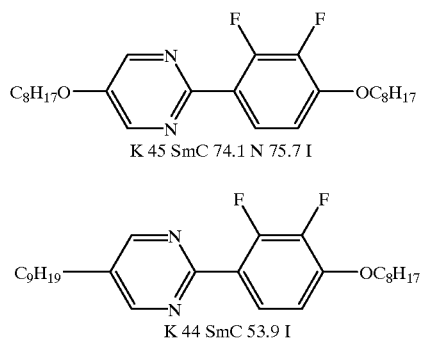

8O.O8diFPYP

K 45 SmC 74.1 N 75.7 I

9.O8diFPYP

K 44 SmC 53.9 I

The resultant host material HM1 had the following properties:

Phase property: I 64.4–62.3 N 63.3 SmC 15 K (crystal)

Melting point: 27.4° C.

A mixture was formulated which comprised 69 wt % of the above host material HM1 and 31 wt % of the following phase enhancing compound:

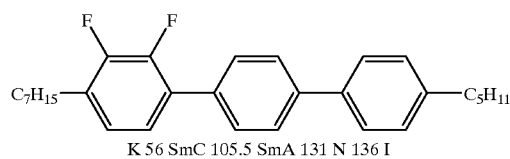

5.7diFTP

K 56 SmC 105.5 SmA 131 N 136 I

The resultant three-component host mixture had the following properties:

Phase property: I 74.2–72.9 N 70.1 SmA 69.2 SmC −2 insoluble −9 K

Melting point: 22° C.

To introduce chirality, 2 wt % of the following chiral dopant material was mixed with 98 wt % of the above three-component host mixture:

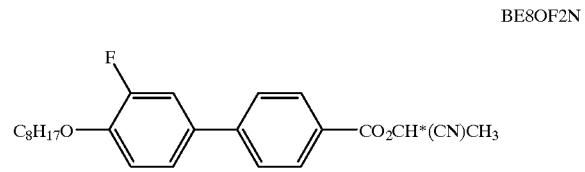

BE8OF2N

The resultant liquid crystal composition consisted of, in weight%:

33.81 8O.O8diFPYP 33.81 9.O8diFPYP 30.38 5.7diFTP 2 BE8OF2N and had the following properties:

Phase property: I 73.3 N* 70.7 SmA 67.5 SmC* 0 insoluble −3 K

| Temp. (° C.) | $T_{(A-C^*)}$ (° C.) | d ($\mu$m) | Ps (nC · $cm^{-2}$) | $\tau_{min}$ ($\mu$s) | $V_{min}$ (V) | $\theta$ (°) | Mv | Mt | Mo | $\theta_m$ 5 Vac(°) |
|---|---|---|---|---|---|---|---|---|---|---|
| 36.1 | 66.1 | 1.52 | 8.62 | 15 | 37.2 | 24.8 | 2.51 | 0.18 | 0.45 | 14.6 |
| 25 | 66.1 | 1.52 | 10.61 | 26 | 35.2 | 26.8 | 1.93 | 0.31 | 0.60 | 16.0 |
| 0 | 66.1 | 1.52 | 14.1 | 113 | 30.1 | 28 | 1.23 | 1.44 | 1.77 | 17.1 |

In the above:

Temp. is the temperature at which the relevant property is measured, $T_{(A-C^*)}$ is the transition temperature from SmA to SmC*, d is the cell gap, Ps is the spontaneous polarisation coefficient (i.e. the bulk ferroelectric polarisation induced by the chiral dopant), $\tau_{min}$ is the minimum switching response time (pulse width), $V_{min}$ is the minimum switching voltage at $\tau_{min}$, $\theta$ is the cone angle, Mv is a merit figure relating to the switching voltage properties ($Mv=\epsilon_o \cdot V_{min}/d.Ps$), Mt is a merit figure relating to the switching speed properties ($Mt=V_{min} \cdot \tau_{min} \cdot Ps/d.\sin^2\theta$), Mo is a merit figure relating to the overall properties (Mo=Mv.Mt), $\theta_m$ is the memory angle measured with applied ac (5 Vac rms), and $\epsilon_o$ is the permittivity of free space The above merit figures are obtained as described in Slaney et al, Ferroelectrics, 1996, 178(1), 65–74.

EXAMPLE 2

Example 1 was repeated except that 2.2 wt % of BE8OF2N was mixed with 97.8 wt % of the three-component host mixture.

The resultant liquid crystal composition consisted of, in weight%:

33.74 8O.O8diFPYP
33.74 9.O8diFPYP
30.32 5.7diFTP
2.2 BE8OF2N and had the following properties:

Phase property:
  I 70.0 N* 67.1 SmA 63.9 SmC* 3.6 insoluble −0.8 K
Melting point: 25.2° C. (glass slides)

| Temp. (° C.) | $T_{(A-C^*)}$ (° C.) | d ($\mu$m) | Ps (nC · cm$^{-2}$) | $\tau_{min}$ ($\mu$s) | $V_{min}$ (V) | $\theta$ (°) | Mv | Mt | Mo | $\theta_m$ 5 Vac(°) |
|---|---|---|---|---|---|---|---|---|---|---|
| 35.4 | 65.4 | 1.51 | 11.5 | 9 | 46.4 | 26.2 | 2.36 | 0.16 | 0.38 | 14.0 |
| 25 | 65.4 | 1.51 | 12.8 | 16 | 41.3 | 28.1 | 1.87 | 0.25 | 0.47 | 16.7 |
| 0 | 65.4 | 1.51 | 17.2 | 78 | 36.4 | 28.7 | 1.24 | 1.40 | 1.74 | 17.6 |

EXAMPLE 3

Example 1 was repeated except that 2.7 wt % of BE8OF2N was mixed with 97.3 wt % of the three-component host mixture.

The resultant liquid crystal composition consisted of, in weight%:

33.57 8O.O8diFPYP
33.57 9.O8diFPYP
30.16 5.7diFTP
2.7 BE8OF2N and had the following properties:

Phase property:
  I 71.2 N* 70.0 SmA 66.3 SmC* 0 K
Melting point: 29.4° C. (glass slides)

| Temp. (° C.) | $T_{(A-C^*)}$ (° C.) | d ($\mu$m) | Ps (nC · cm$^{-2}$) | $\tau_{min}$ ($\mu$s) | $V_{min}$ (V) | $\theta$ (°) | Mv | Mt | Mo | $\theta_m$ 5 Vac(°) |
|---|---|---|---|---|---|---|---|---|---|---|
| 35.6 | 65.6 | 1.35 | 12.2 | [1] | [1] | 25.1 | — | — | — | 13.4 |
| 25 | 65.6 | 1.35 | 14.1 | 9 | 48 | 26.9 | 2.23 | 0.22 | 0.49 | 14.7 |

[[1] did not show $\tau$-$V_{min}$ properties]

EXAMPLE 4

The same two components of the host material HM1 were used to form a host material (HM2) containing 9.O8diFPYP and 8O.O8diFPYP in amounts of 55 wt % and 45 wt %, respectively.

The resultant host material HM2 had the following properties:

Phase property: I 63.6–61.3 N 63.2 SmC 12.6 K

Melting point: 27.4° C.

A mixture was formulated which comprised 69 wt % of the above host material HM2 and 31 wt % of 7.5diFTP identified in Example 1 above.

The resultant three-component host mixture had the following properties:

Phase property: I 74.9–71.1 N 68.6 SmA 67.4 SmC −5.5 K

Melting point: 22.8° C.

To 76 wt % of the three-component host mixture was added 22.7 wt % of the following compound:

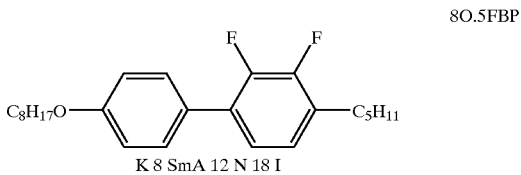

8O.5FBP

K 8 SmA 12 N 18 I

The resultant four-component host mixture had the following properties:

Phase property: I 66.3–62.4 N 57.8 SmA 56.3 SmC −12.5 K

Melting point: 15° C.

To introduce chirality, 2.1 wt % of the chiral dopant material BE8OF2N referred to in Example 1 above was mixed with 97.9 wt % of the above four-component host mixture. The resultant liquid crystal composition consisted of, in weight%:

23.50 8O.O8diFPYP
28.73 9.O8diFPYP
23.47 5.7diFTP
22.2 8O.5diFBP
2.1 BE8OF2N and had the following properties:

Phase property:

I 60.2–57.2 N* 53.3 SmA 48 SmC* −40 insoluble

Soluble: 14.2° C.

| Temp. (°C.) | $T_{(A-C*)}$ (°C.) | d (μm) | Ps (nC·cm$^{-2}$) | $\tau_{min}$ (μs) | $V_{min}$ (V) | θ (°) | Mv | Mt | Mo | $\theta_m$ 5 Vac(°) |
|---|---|---|---|---|---|---|---|---|---|---|
| 25 | 48 | 1.26 | 8.31 | 18 | 29.6 | 23.3 | 2.50 | 0.22 | 0.55 | C1T[1] |
| 18 | 48 | 1.26 | 8.99 | 24 | 28.4 | 24.5 | 2.22 | 0.28 | 0.62 | C1T[1] |
| 0 | 48 | 1.26 | 12.05 | 97 | 25.6 | 27.4 | 1.49 | 1.12 | 1.67 | C1T[1] |

[[1]alignment state – chevron = C1T indicates twisted alignment]

EXAMPLE 5

68 wt % of the host material HM2 was mixed with 32 wt % of the following compound:

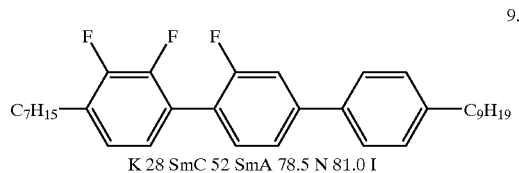

9.7triFTP

K 28 SmC 52 SmA 78.5 N 81.0 I

The resultant three-component host mixture had the following properties:

Phase property: I 63.1–62.3 N 61.2 SmA 59.6 SmC –3 K
Melting point: 21.2° C.

To introduce chirality, 2.0 wt % of the chiral dopant material BE8OF2N referred to in Example 1 above was mixed with 98 wt % of the above three-component host mixture. The resultant liquid crystal composition consisted of, in weight%:

30 8O.O8diFPYP
36.65 9.O8diFPYP
31.35 9.7triFTP
2 BE8OF2N and had the following properties:

Phase property:
1 60.0–59.0 N* 58.2 SmA 54.9 SmC* –31.4 insoluble and crystallizes
Melting Point: 7.8° C.

| Temp. (°C.) | $T_{(A-C*)}$ (°C.) | d (μm) | Ps (nC·cm$^{-2}$) | $\tau_{min}$ (μs) | $V_{min}$ (V) | θ (°) | Mv | Mt | Mo | $\theta_m$ 5 Vac(°) |
|---|---|---|---|---|---|---|---|---|---|---|
| 25 | 54.9 | 1.45 | 9.43 | 32.7 | 31.5 | 25.5 | 2.04 | 0.36 | 0.73 | C2T[1] |
| 0 | 54.9 | 1.45 | 12.95 | 183 | 24.9 | 27.3 | 1.17 | 1.91 | 2.23 | C2T[1] |

[[1]alignment state – chevron = C2, T indicates twisted alignment]

EXAMPLES 6 to 12

In a similar manner to the previous Examples, further liquid crystal compositions were formulated according to Table 1 below and the properties of such compositions are shown in Tables 2, 3 and 4 below.

TABLE 1

| Ingredient | 6 | 7 | 8 | 9 | 10 | 11 | 12 |
|---|---|---|---|---|---|---|---|
| 8O.O8diFPYP | 30.4 | 23.5 | 21.84 | 15.86 | 16.36 | 21.72 | 15.70 |
| 9O.O8diFPYP | — | — | 7.67 | 19.38 | 5.75 | 7.63 | 19.18 |
| 9.O7diFPYP | — | — | 12.53 | — | 9.38 | 12.47 | — |
| 9.O8diFPYP | 37.2 | 28.6 | 12.53 | — | 9.38 | 12.47 | — |
| 9.O9diFPYP | — | — | 12.53 | — | 9.38 | 12.47 | — |
| 5O.6diFTP | — | — | — | 5.93 | 4.63 | — | 5.87 |
| 5.O8diFTP | — | — | — | 3.65 | 2.85 | — | 3.61 |
| 5.O6mdiFTP[1] | — | — | — | 4.11 | 3.20 | — | 4.07 |
| 5.7diFTP | — | 23.4 | 30.5 | 15.97 | 12.47 | 30.34 | 15.81 |
| 7.9diFTP | — | — | — | 15.97 | 12.47 | — | 15.81 |
| 9.7triFTP | 30.4 | — | — | — | — | — | — |
| 8O.5diFBP | — | 22.5 | — | — | — | — | — |
| 5.O8diFBP | — | — | — | 17.3 | 11.13 | — | 16.95 |
| BE8OF2N | 2.0 | 2.0 | 2.4 | 2.0 | 3.0 | 2.9 | 3.0 |
| Best Align. | P1[2] | P1[2] | P1[2] | P1[2] | P1[2] | | |

[[1]mdiFTP indicates a diFTP compound where the two fluorine substituents are located on the middle phenyl group as in the FTP compounds of the formula [III] above, the remaining diFTP compounds in Table 1 being of the formula [II] above.
[2]P1 indicates test conducted in a cell with an LQT120 alignment layer from Hitachi]

TABLE 2

| Ex. No. | Phase Property (between glass slides) °C. | |
|---|---|---|
| 6 | I 60–59 N* 58.2 SmA 54.9 SmC* −31.4 ¹oos | mpt 7.8° C. |
| 7 | I 60.2–57.2 N* 53.3 SmA 48 SmC* −40 ¹oos | ²is 14.2° C. |
| 8 | I 72.5–68.0 N* 69.5–68 SmA 64.6 SmC* −4.8 | mpt 14.5–15.6° C. |
| 9 | I 77.6–72.3 N* 63.1 SmA 57.7 SmC* −22 K | mpt ⁻5° C. |
| 10 | I 74–68.4 N* 65.5 SmA 57.8 SmC* −20 K | mpt 6.8° C. |
| 11³ | I 70.9–65.7 N* 65.7 SmA 62.38 SmC* 62.8 | mpt 29.4° C. |
| 12³ | I 76.1–70.9 N* 71.4–70.9 SmA 63.3 SmC* 57.3 | mpt 5° C. |

[¹oos = material comes out of solution (on cooling);
²is = material goes back into solution (on heating);
³phase behaviour in ⁻1.2 μm cells]

TABLE 3

(Properties at 30° C. below the A–C* transition)

| Ex. No. | d (μm) | $T_{A-C^*}$ (° C.) | ΔA (° C.) | Ps (nC cm⁻²) | $V_{min}$ (V) | $\tau_{min}$ (μs) | θ (°) | $\theta_m$ (°) | $\theta/\theta_m$ | Mv | Mt | Mo | MPt (° C.) |
|---|---|---|---|---|---|---|---|---|---|---|---|---|---|
| 6 | 1.47 | 55 | 5.4 | 9.09 | 29.8 | 29.9 | 25.4 | 16.4 | 1.55 | 1.97 | 0.30 | 0.59 | 7.8 |
| 7 | 1.50 | 48.5 | 5.1 | 8.99 | 28.4 | 24 | 24.3 | 11.6 | 2.09 | 1.86 | 0.24 | 0.45 | 14.2 |
| 8 | 1.52 | 61.3 | 4.2 | 11.3 | 36.5 | 11 | 21.7 | 13.4 | 1.62 | 1.88 | 0.22 | 0.41 | 15 |
| 9 | 1.55 | 59.1 | 5.8 | 6.64 | 24 | 22 | 22.8 | 11.8 | 1.93 | 2.06 | 0.15 | 0.31 | ⁻5 |
| 10 | 1.24 | 57.4 | 7.7 | 13.3 | 35 | 7.2 | 24.3 | 11.2 | 2.16 | 1.88 | 0.18 | 0.34 | 7 |

TABLE 4

(Properties at 25° C.)

| Ex. No. | d (μm) | $T_{A-C^*}$ (° C.) | ΔA (° C.) | Ps (nC cm⁻²) | $V_{min}$ (V) | $\tau_{min}$ (μs) | θ (°) | $\theta_m$ (°) | $\theta/\theta_m$ | Mv | Mt | Mo | MPt (° C.) |
|---|---|---|---|---|---|---|---|---|---|---|---|---|---|
| 6 | 1.47 | 55 | 5.4 | 9.43 | 29.8 | 29.9 | 25.4 | 16.4 | 1.55 | 1.97 | 0.30 | 0.59 | 7.8 |
| 7 | 1.50 | 48.5 | 5.1 | 8.31 | 31.2 | 15 | 22.7 | 11.6 | 1.96 | 2.22 | 0.15 | 0.33 | 14.2 |
| 8 | 1.52 | 61.3 | 4.2 | 12.9 | 35 | 13 | 27.4 | 14.3 | 1.91 | 1.58 | 0.18 | 0.28 | 15 |
| 9 | 1.55 | 59.1 | 5.8 | 6.9 | 24 | 22 | 23.9 | 11.8 | 2.03 | 1.99 | 0.14 | 0.29 | ⁻5 |
| 10 | 1.24 | 57.4 | 7.7 | 13.6 | 33 | 9.1 | 25.1 | 12.5 | 2.0 | 1.73 | 0.18 | 0.32 | 7 |

TABLE 5

(Properties at various temperatures)

| Mix | d (μm) | $T_{A-C^*}$ (° C.) | ΔA (° C.) | Ps (nC cm⁻²) | $V_{min}$ (V) | $\tau_{min}$ (μs) | θ (°) | $\theta_m$ (°) | $\theta/\theta_m$ | Mv | Mt | Mo | MPt |
|---|---|---|---|---|---|---|---|---|---|---|---|---|---|
| | | | | | 45(° C.) | | | | | | | | |
| 10 | 1.24 | 57.4 | 7.7 | 8.0 | 54 | 1.5 | 21.0 | 8.4 | 2.50 | 4.82 | 0.04 | 0.19 | 5.4 |
| 11 | 1.16 | 62.8 | 2.9 | 10.75 | No τ · $V_{min}$ | | 18.1 | 10.2 | 1.77 | N/A | N/A | N/A | 29.4 |
| 12 | 1.12 | 63.3 | 7.6 | 11.12 | No τ · $V_{min}$ | | 16.3 | 8.8 | 1.85 | N/A | N/A | N/A | 8.7 |
| | | | | | 35(° C.) | | | | | | | | |
| 10 | 1.24 | 57.4 | 7.7 | 10.5 | 36.7 | 4.4 | 23.8 | 10.3 | 2.31 | 2.50 | 0.08 | 0.20 | 5.4 |
| 11 | 1.16 | 62.8 | 2.9 | 13.38 | 45.5 | 5 | 21.0 | 12.2 | 1.72 | 2.60 | 0.20 | 0.52 | 29.4 |
| 12 | 1.12 | 63.3 | 7.6 | 13.75 | 51.5 | 4 | 17.4 | 11.2 | 1.55 | 2.96 | 0.28 | 0.83 | 8.7 |

TABLE 5-continued (Properties at various temperatures)

| Mix | d ($\mu$m) | $T_{A-C^*}$ (°C.) | $\Delta A$ (°C.) | Ps (nC cm$^{-2}$) | $V_{min}$ (V) | $\tau_{min}$ ($\mu$s) | $\theta$ (°) | $\theta_m$ (°) | $\theta/\theta_m$ | Mv | Mt | Mo | MPt |
|---|---|---|---|---|---|---|---|---|---|---|---|---|---|
| 25(° C.) | | | | | | | | | | | | | |
| 10 | 1.24 | 57.4 | 7.7 | 13.0 | 32.3 | 7.8 | 25.9 | 12.3 | 2.11 | 1.77 | 0.14 | 0.25 | 5.4 |
| 11 | 1.16 | 62.8 | 2.9 | 15.78 | 35.4 | 9 | 21.7 | 12.7 | 1.71 | 1.71 | 0.32 | 0.55 | 29.4 |
| 12 | 1.12 | 63.3 | 7.6 | 16.30 | 45.5 | 6 | 18.5 | 12.4 | 1.49 | 2.21 | 0.39 | 0.86 | 8.7 |
| 15(° C.) | | | | | | | | | | | | | |
| 10 | 1.24 | 57.4 | 7.7 | 15.0 | 30.3 | 13 | 26.7 | 13.4 | 1.99 | 1.44 | 0.24 | 0.35 | 5.4 |
| 11 | 1.16 | 62.8 | 2.9 | 17.90 | 31.2 | 13 | 22.1 | 14.4 | 1.53 | 1.33 | 0.44 | 0.59 | 29.4 |
| 12 | 1.12 | 63.3 | 7.6 | 18.30 | 33.45 | 11 | 19.2 | 13.4 | 1.43 | 1.45 | 0.56 | 0.81 | 8.7 |

EXAMPLES 13 to 17

In a similar manner to the previous Examples, further liquid crystal compositions were formulated according to Table 6 below and the properties of such compositions are shown in Tables 7, 8 and 9 below.

TABLE 6

Example Number and Amount (wt %)

| Ingredient | 13 | 14 | 15 | 16 | 17 |
|---|---|---|---|---|---|
| 8O.O8diFPYP | 17.52 | 18.04 | 16.36 | 16.36 | 16.36 |
| 9O.O8diFPYP | 5.98 | 6.16 | 5.75 | 5.75 | 5.75 |
| 9.O7diFPYP | 10.13 | 10.43 | 9.38 | 9.38 | 9.38 |
| 9.O8diFPYP | 10.14 | 10.44 | 9.38 | 9.38 | 9.38 |
| 9.O9diFPYP | 10.14 | 10.44 | 9.38 | 9.38 | 9.38 |
| 5.O6diFTP | 4.97 | 5.04 | 4.63 | 4.63 | 4.63 |
| 5.O8diFTP | 3.06 | 3.10 | 2.85 | 2.85 | 2.85 |
| 5.O6mdiFTP[1] | 3.44 | 3.49 | 3.20 | 2.85 | 2.85 |
| 5.7diFTP | 13.38 | 13.58 | 12.47 | 12.47 | 12.47 |
| 7.9diFTP | 13.39 | 13.58 | 12.47 | 12.47 | 12.47 |
| 5.7triFTP | — | — | 5.56 | 11.13 | — |
| 9.5triFTP | — | — | — | — | 4.56 |
| 9.9triFTP | — | — | — | — | 1.89 |
| 9.7triFTP | — | — | — | — | 4.68 |
| 5.O8diFBP | 4.85 | 2.8 | 5.57 | — | — |
| BE8OF2N | 3.0 | 2.9 | 3.0 | 3.0 | 3.0 |

[[1]mdiFTP indicates a diFTP compound where the two fluorine substituents are located on the middle phenyl group as in the FTP compounds of the formula [III] above, the remaining diFTP compounds in Table 6 being of the formula [II] above.]

TABLE 7

| Ex. No. | Phase Property (° C.) | |
|---|---|---|
| 13 | I 78.6–74.5 N* 70.9 SmA 64.5 SmC* −17 K | mpt 7 |
| 14 | I 60.2–57.2 N* 53.3 SmA 48 SmC* −30 (10 mins) K | mpt 9 |
| 15 | I 84–76.6 N* 76.5–75.7 SmA 69.3 SmC* −14 K | mpt −5 |
| 16 | I 76.4–73.1 N* 70.1 SmA 62.8 SmC* −30 K | mpt 4.2 |
| 17 | I 75.2–71.4 N* 71.6 SmA 62.8 SmC* −30 (10 mins) oos[1] | is[2] 0 |

[[1]oos = material comes out of solution (on cooling); [2]is = material goes back into solution (on heating)]

TABLE 8

(Properties at 30° C. below the A–C* transition)

| Ex. No. | d ($\mu$m) | $T_{A-C^*}$ (°C.) | $\Delta A$ (°C.) | Ps (nC cm$^{-2}$) | $V_{min}$ (V) | $\tau_{min}$ ($\mu$s) | $\theta$ (°) | $\theta_m$ (°) | $\theta/\theta_m$ | Mv | Mt | Mo |
|---|---|---|---|---|---|---|---|---|---|---|---|---|
| 13 | 1.42 | 64.5 | 6.4 | 11.5 | 40 | 5.6 | 25.5 | 11.1 | 2.3 | 2.17 | 0.1 | 0.21 |
| 14 | 1.55 | 63 | 3.8 | 12.1 | 53.8 | 11 | 25.4 | C1T | C1T | 2.54 | 0.25 | 0.64 |
| 15 | 1.49 | 67.9 | 4.6 | 12.7 | 67.6 | 7 | 25.5 | C1T | C1T | 3.16 | 0.22 | 0.70 |
| 16 | 1.53 | 60.8 | 7.7 | 11.6 | 48.3 | 7.3 | 23.6 | 9.7 | 2.43 | 2.41 | 0.17 | 0.39 |
| 17 | 1.69 | 62.8 | 8.8 | 13.8 | 65.8 | 5.9 | 25.4 | 10.8 | 2.35 | 2.50 | 0.18 | 0.43 |

TABLE 9

(Properties at 25° C.)

| Ex. No. | d ($\mu$m) | $T_{A-C^*}$ (°C.) | $\Delta A$ (°C.) | Ps (nC cm$^{-2}$) | $V_{min}$ (V) | $\tau_{min}$ ($\mu$s) | $\theta$ (°) | $\theta_m$ (°) | $\theta/\theta_m$ | Mv | Mt | Mo |
|---|---|---|---|---|---|---|---|---|---|---|---|---|
| 13 | 1.42 | 64.5 | 6.4 | 13.7 | 37 | 9.7 | 26.5 | 12.8 | 2.07 | 1.68 | 0.18 | 0.29 |
| 14 | 1.55 | 63 | 3.8 | 14 | 48.9 | 22 | 26.2 | C1T | C1T | 2 | 0.5 | 1 |
| 15 | 1.49 | 67.9 | 4.6 | 15.3 | 58 | 16.5 | 27.5 | C1T | C1T | 2.25 | 0.46 | 1.04 |
| 16 | 1.53 | 60.8 | 7.7 | 13.4 | 47.6 | 10 | 23.9 | 10.2 | 2.34 | 2.06 | 0.26 | 0.54 |
| 17 | 1.69 | 62.8 | 8.8 | 17.1 | 60.2 | 8.4 | 25.8 | 12 | 2.15 | 1.84 | 0.27 | 0.49 |

EXAMPLES 18 to 22

In a similar manner to the previous Examples, further liquid crystal compositions were formulated according to Table 10 below and the properties of such compositions are shown in Tables 11, 12 and 13 below.

TABLE 10

| Ingredient | Example Number and Amount (wt %) | | | | |
|---|---|---|---|---|---|
| | 18 | 19 | 20 | 21 | 22 |
| 8O.O8diFPYP | 15.76 | 14.10 | 13.58 | 15.28 | 9.46 |
| 9O.O8diFPYP | 5.38 | 4.78 | 4.77 | 5.22 | 3.23 |
| 9.O7diFPYP | 9.12 | 8.10 | 7.79 | 8.84 | 5.47 |
| 9.O8diFPYP | 9.12 | 8.10 | 7.79 | 8.83 | 5.47 |
| 9.O9diFPYP | 9.12 | 8.10 | 7.78 | 8.83 | 5.47 |
| 5.O6diFTP | 4.41 | 3.92 | 3.84 | — | — |
| 5.O8diFTP | 2.72 | 2.42 | 2.36 | — | — |
| 5.O6mdiFTP[1] | 3.06 | 2.72 | 2.66 | — | — |
| 5.7diFTP | 11.88 | 10.56 | 10.35 | 15.80 | 19.0 |
| 7.9diFTP | 11.88 | 10.56 | 10.35 | 15.80 | 19.0 |
| 7.5triFTP | 14.55 | 12.93 | — | — | — |
| 7.O8triFTP | — | — | — | 7.22 | 8.7 |
| 7.O10triFTP | — | — | — | 6.33 | 7.6 |
| 5.O8diFBP | — | 11 | 9.24 | 4.85 | — |
| 5.5diFQP[2] | — | — | 17 | — | — |
| 6O.O6diFPhn[3] | — | — | — | — | 13.6 |
| BE8OF2N | 3.0 | 2.8 | 2.49 | 3.0 | 3.0 |

[1]mdiFTP indicates a diFTP compound where the two fluorine substituents are located on the middle phenyl group as in the FTP compounds of the formula [III] above, the remaining diFTP compounds being of the formula [II] above.
[2]indicates

TABLE 10-continued

| Ingredient | Example Number and Amount (wt %) | | | | |
|---|---|---|---|---|---|
| | 18 | 19 | 20 | 21 | 22 |

$C_5H_{11}$—(structure with F, F substituents)—$C_5H_{11}$  5.5diFQP

[3]indicates $C_6H_{13}O$—(phenanthrene structure with F, F)—$OC_6H_{13}$  6O.O6diFPhn

TABLE 11

| Ex. No. | Phase Property (° C.) | |
|---|---|---|
| 18 | I 77.9–74.8 N* 71.2 SmA 63.2 SmC* −20 K | mpt 4.5 |
| 19 | I 71.5–67.2 N* 62.2 SmA 53 SmC* <−30 K | mpt 4.5 |
| 20 | I 100.1–84.9 N* 77.0–75.5 SmA 70.1 SmC* −40 oos[1], is[2] | 0 |
| 21 | I 75.0–73.1 N* 67.4 SmA 61.3 SmC* | |
| 22 | I 89.5–85.9 N* 82.95 SmA 62.8 SmC* −25 K | mpt −12 |

[[1]oos = material comes out of solution (on cooling);
[2]is = material goes back into solution (on heating)]

TABLE 12

(Properties at 30° C. below the A–C* transition)

| Ex. No. | d (μm) | $T_{A-C^*}$ (° C.) | ΔA (° C.) | Ps (nC cm$^{-2}$) | $V_{min}$ (V) | $\tau_{min}$ (μs) | θ (°) | $\theta_m$ (°) | θ/$\theta_m$ | Mv | Mt | Mo |
|---|---|---|---|---|---|---|---|---|---|---|---|---|
| 18 | 1.16 | 63.1 | 8 | 11.81 | 56.2 | 5 | 19 | 9 | 2.11 | 3.63 | 0.17 | 0.63 |
| 19 | 1.55 | 51 | 16 | 9.5 | 48.3 | 16 | 24.2 | C1T | C1T | 2.90 | 0.28 | 0.81 |
| 20 | 1.54 | 70.1 | 6.05 | 9.3 | 60 | 4.9 | 25.4 | 10.7 | 2.37 | 3.71 | 0.15 | 0.56 |
| 21 | 1.5 | 61.3 | 6.1 | 11.6 | 55 | 8 | 25.6 | 12 | 2.13 | 2.84 | 0.19 | 0.52 |
| 22 | 1.5 | 63.1 | 18.7 | 9.6 | 47.5 | 8.7 | 22.5 | 11.7 | 1.97 | 2.92 | 0.18 | 0.53 |

TABLE 13

(Properties at 25° C.)

| Ex. No. | d (μm) | $T_{A-C^*}$ (° C.) | ΔA (° C.) | Ps (nC cm$^{-2}$) | $V_{min}$ (V) | $\tau_{min}$ (μs) | θ (°) | $\theta_m$ (°) | θ/$\theta_m$ | Mv | Mt | Mo |
|---|---|---|---|---|---|---|---|---|---|---|---|---|
| 18 | 1.16 | 63.1 | 8 | 13.2 | 50.6 | 8.6 | 24 | 9.9 | 2.42 | 2.92 | 0.26 | 0.77 |
| 19 | 1.55 | 51 | 16 | 9.4 | 49.7 | 13.3 | 23 | C1T | C1T | 3.02 | 0.26 | 0.78 |
| 20 | 1.54 | 70.1 | 6.05 | 11.8 | 55 | 12 | 27.1 | 12.2 | 2.22 | 2.69 | 0.37 | 1 |
| 21 | 1.5 | 61.3 | 6.1 | 12.8 | 52.5 | 11 | 26.7 | 13 | 2.05 | 2.45 | 0.25 | 0.61 |
| 22 | 1.5 | 63.1 | 18.7 | 11.1 | 60 | 15 | 23.3 | 13.3 | 21.81 | 2.39 | 0.34 | 0.81 |

EXAMPLES 23 to 25

In a similar manner to the previous Examples, further liquid crystal compositions were formulated according to Table 14 below and the properties of such compositions are shown in Tables 15, 16 and 17 below.

TABLE 14

| Ingredient | Example Number and Amount (wt %) | | |
|---|---|---|---|
| | 23 | 24 | 25 |
| 8O.O8diFPYP | 12.99 | 12.04 | 12.71 |
| 9O.O8diFPYP | 4.55 | 4.23 | 15.53 |
| 9.O7diFPYP | 7.45 | 6.89 | — |
| 9.O8diFPYP | 7.45 | 6.89 | — |
| 9.O9diFPYP | 7.45 | 6.89 | — |
| 5.O6diFTP | 3.68 | 3.40 | 4.75 |
| 5.O8diFTP | 2.26 | 2.09 | 2.92 |
| 5.O6mdiFTP[1] | 2.54 | 2.35 | 3.29 |
| 5.7diFTP | 9.90 | 9.17 | 12.79 |
| 7.9diFTP | 9.90 | 9.17 | 12.79 |
| 5.O8diFBP | 8.84 | 12.88 | 13.72 |
| 7.5diFQP[2] | 10 | — | 9.8 |
| 6O.O6diFPhn[3] | 10 | 10.1 | — |
| 6O.8FPrP[4] | — | — | 9.8 |
| BE8OF2N | 3.0 | 3.1 | 1.9 |

[[1]mdiFTP indicates a diFTP compound where the two fluorine substituents are located on the middle phenyl group as in the FTP compounds of the formula [III] above, the remaining diFTP compounds being of the formula [II] above.]

[2] indicates 7.5diFQP

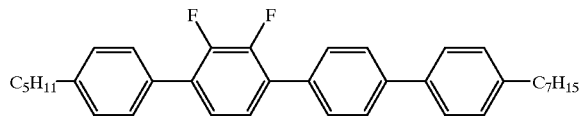

[3] indicates 6O.O6diFPhn

[4] indicates 6O.8FPrP

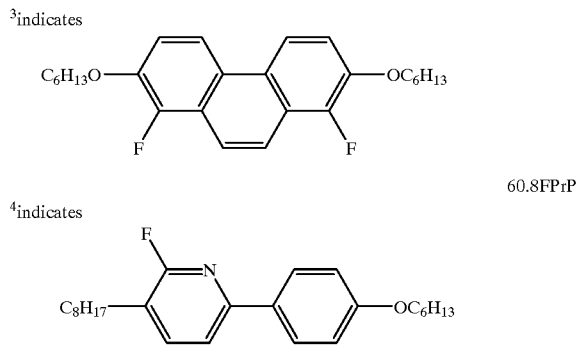

TABLE 15

| Ex. No. | Phase Property (° C.) |
|---|---|
| 23 | I 93.5–79.9 N* 77.7–75.5 SmA 64.4 SmC did not crystallize |
| 24 | I 90.8–78.0 N* 76.5–73.5 SmA 58.6 SmC did not crystallize |
| 25 | I 81.0–75.4 N* 69.7 SmA 67.5 SmC −28 ([1]oos) |

[[1]oos = material comes out of solution (on cooling)]

TABLE 16

(Properties at 30° C. below the A–C* transition)

| Ex. No. | d (μm) | $T_{A-C^*}$ (° C.) | ΔA (° C.) | Ps (nC cm$^{-2}$) | $V_{min}$ (V) | $\tau_{min}$ (μs) | θ (°) | $\theta_m$ (°) | $\theta/\theta_m$ | Mv | Mt | Mo |
|---|---|---|---|---|---|---|---|---|---|---|---|---|
| 23 | 1.51 | 65.5 | 13 | 11.35 | 46.1 | 6.1 | 22 | 12 | 1.83 | 2.38 | 0.15 | 0.36 |
| 24 | 1.43 | 59.6 | 14.9 | 9.7 | 47.6 | 8.1 | 22.2 | 10.7 | 2.07 | 3.03 | 0.18 | 0.56 |
| 25 | 1.64 | 66.1 | 5.5 | 8 | 42.7 | 13.2 | 25.6 | 12.5 | 2.05 | 2.88 | 0.15 | 0.47 |

TABLE 17

(Properties at 25° C.)

| Ex. No. | d (μm) | $T_{A-C^*}$ (° C.) | ΔA (° C.) | Ps (nC cm$^{-2}$) | $V_{min}$ (V) | $\tau_{min}$ (μs) | θ (°) | $\theta_m$ (°) | $\theta/\theta_m$ | Mv | Mt | Mo |
|---|---|---|---|---|---|---|---|---|---|---|---|---|
| 23 | 1.51 | 65.5 | 13 | 12.14 | 42.7 | 11.6 | 22.8 | 12 | 1.9 | 2.06 | 0.27 | 0.59 |
| 24 | 1.43 | 59.6 | 14.9 | 11.2 | 44 | 10.7 | 23 | 13.1 | 1.76 | 2.43 | 0.24 | 0.60 |
| 25 | 1.64 | 66.1 | 5.5 | 9.4 | 39.9 | 24.9 | 28.2 | 13.9 | 2.03 | 2.29 | 0.26 | 0.60 |

What is claimed is:

1. A liquid crystal composition comprising:
    (1) an achiral host mixture comprising:
        (a) at least 20% by weight, based on the total weight of the host mixture, of at least two difluorinated phenylpyrimidine (diFPYP) compounds capable of exhibiting an SmC phase, wherein the at least two difluorinated phenylpyrimidine compounds are of the general formula shown below:

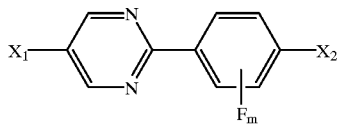

wherein $X_1$ and $X_2$ are independently selected from the group consisting of $(C_1-C_{12})$alkyl and $(C_1-C_{12})$alkoxy, and m is equal to 2, and (b) at least 10% by weight, based on the total weight of the host mixture, of at least one fluorinated terphenyl compound which is selected from the group consisting of difluorinated terphenyl compounds and trifluorinated terphenyl compounds and which enhances the phase of said mixture, wherein the total amount of (a) and (b) is at least 50% by weight based on the total weight of the host mixture, wherein component (b) is selected from difluorinated terphenyl compounds and trifluorinated terphenyl compounds represented by the general formula shown below:

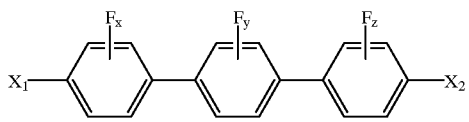

where $X_1$ and $X_2$ are independently selected from the group consisting of $(C_1-C_{12})$alkyl and $(C_1-C_{12})$alkoxy, and x is equal to 0, 1, 2, or 3, y is equal to 0, 1, 2, or 3, and z is equal to 0, 1, 2, or 3 with the proviso that the total of (x+y+z) is equal to 2 or 3; and (2) at least one chiral dopant in an amount of not more than 10% by weight of the total weight of the composition.

2. A liquid crystal composition as claimed in claim 1, wherein (a) is present in an amount of at least 30% by weight based on the total weight of the host mixture.

3. A liquid crystal composition as claimed in claim 1, wherein the total amount of (a) and (b) is 50 to 98% by weight based on the total weight of the host mixture.

4. A liquid crystal composition as claimed in claim 1, wherein the total amount of (a) and (b) is 60 to 95% by weight based on the total weight of the host mixture.

5. A liquid crystal composition comprising:
   (1) an achiral host mixture comprising:
      (a) at least 20% by weight, based on the total weight of the host mixture, of at least two difluorinated phenylpyrimidine (diFPYP) compounds capable of exhibiting an SmC phase, wherein the at least two compounds are of the general formula [I]:

[I]

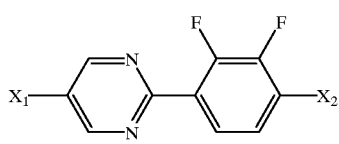

wherein $X_1$ and $X_2$ are independently selected from the group consisting of $(C_1-C_{12})$alkyl and $(C_1-C_{12})$alkoxy, and (b) at least 10% by weight, based on the total weight of the host mixture, of at least one fluorinated terphenyl compound which is selected from the group consisting of difluorinated terphenyl compounds and trifluorinated terphenyl compounds and which enhances the phase of said mixture, wherein the total amount of (a) and (b) is at least 50% by weight based on the total weight of the host mixture, and wherein the at least one fluorinated terphenyl compound is selected from the group consisting of fluorinated terphenyl compounds having the general formula [II], fluorinated terphenyl compounds having the general formula [III], fluorinated terphenyl compounds having the general formula [IV] and fluorinated terphenyl compounds having the general formula [V]:

[II]

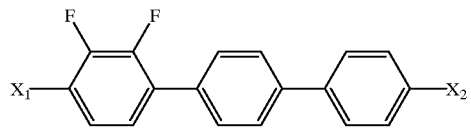

[III]

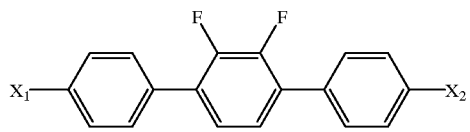

[IV]

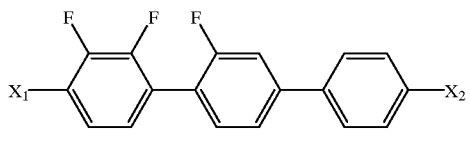

[V]

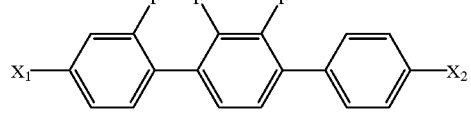

wherein $X_1$ and $X_2$ are independently selected from the group consisting of $(C_1-C_{12})$alkyl and $(C_1-C_{12})$alkoxy; and (2) at least one chiral dopant in an amount of not more than 10% by weight of the total weight of the composition.

6. A liquid crystal composition as claimed in claim 1, wherein the diFPYP compounds are of the general formula [I]:

[I]

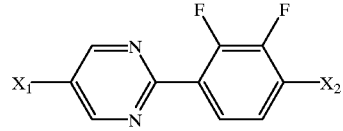

wherein $X_1$ and $X_2$ are independently selected from the group consisting of $(C_1-C_{12})$alkyl and $(C_1-C_{12})$alkoxy.

7. A liquid crystal composition as claimed in claim 6, wherein the mixture of difluorinated phenylpyrimidinyl compounds comprise at least two diFPYP compounds wherein (i) $X_1$ and $X_2$ in at least one diFPYP compound are both $(C_1-C_{12})$alkoxy, and (ii) one of $X_1$ and $X_2$ in at least one other diFPYP compound is $(C_1-C_{12})$alkyl and the other of $X_1$ and $X_2$ is $(C_1-C_{12})$alkoxy.

8. A liquid crystal composition as claimed in claim 1, wherein said at least one fluorinated terphenyl compound is selected from the group consisting of fluorinated terphenyl compounds having the general formula [II], fluorinated terphenyl compounds having the general formula [III], fluorinated terphenyl compounds having the general formula [IV] and fluorinated terphenyl compounds having the general formula [V]:

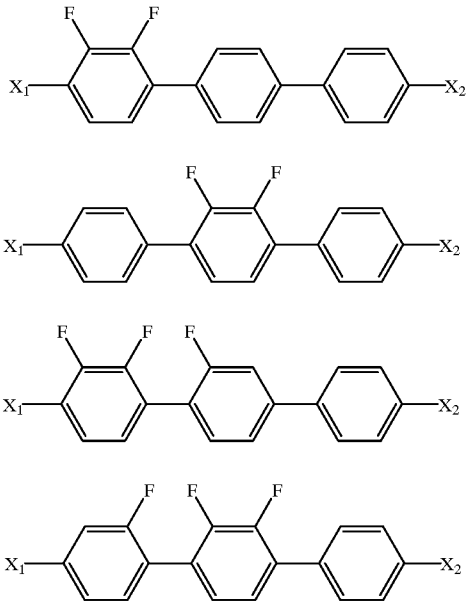

where $X_1$ and $X_2$ are as defined in claim 6.

9. A liquid crystal composition as claimed in claim 8, wherein said at least one fluorinated terphenyl compound is at least one difluorinated terphenyl compound selected from the group consisting of difluorinated terphenyl compounds having the general formula [II] and difluorinated terphenyl compounds having the general formula [III ].

10. A liquid crystal composition as claimed in claim 8, wherein said at least one fluorinated terphenyl compound is a mixture of at least two difluorinated terphenyl compounds selected from the group consisting of difluorinated terphenyl compounds having the general formula [II] and difluorinated terphenyl compounds having the general formula [III].

11. A liquid crystal composition as claimed in claim 10, wherein,in at least one of said difluorinated terphenyl compounds, $X_1$ is $(C_1–C_{12})$alkoxy and $X_2$ is $(C_1–C_{12})$alkyl and, in at least one other of said difluorinated terphenyl compounds, $X_1$ and $X_2$ are both $(C_1–C12)$alkyl.

12. A liquid crystal composition as claimed in claim 11, wherein the at least one alkoxyalkyldifluorinated terphenyl compound is present in a lesser amount than the at least one other dialkyl difluorinated terphenyl compound.

13. A liquid crystal composition as claimed in claim 10, further including a fluorinated biphenyl (FBP) compound.

14. A liquid crystal composition as claimed in claim 13, wherein the FBP compound is a diFBP compound of the formula [VI]:

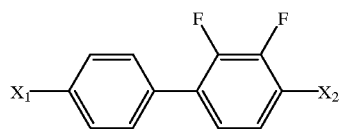

where $X_1$ and $X_2$ are as defined in claim 6.

15. A liquid crystal composition as claimed in claim 13, wherein the FBP compound is present in a smaller amount by weight than the mixture of fluorinated terphenyl (FTP) compounds.

16. A liquid crystal composition as claimed in claim 6, wherein the $(C_1–C_{12})$alkyl is a $(C_5–C_{10})$alkyl.

17. A liquid crystal composition as claimed in claim 16, wherein the $(C_5–C_{10})$alkyl is a $(C_7–C_9)$alkyl.

18. A liquid crystal composition as claimed in claim 6, wherein the $(C_1–C_{12})$alkoxy is a $(C_5–C_{10})$alkoxy.

19. A liquid crystal composition as claimed in claim 18, wherein the $(C_5–C_{10})$alkoxy is a $(C_7–C_9)$alkoxy.

20. A liquid crystal composition as claimed in claim 1, wherein said at least one fluorinated terphenyl compound (b) is present in an amount of 10 to 60% by weight of the total weight of the liquid crystal composition.

21. A liquid crystal composition as claimed in claim 1, wherein said at least one chiral dopant is present in an amount of 1 to 5% by weight based on the total weight of the liquid crystal composition.

22. A liquid crystal composition as claimed in claim 21, wherein said at least one chiral dopant is present in an amount of about 1.2 to 4.2 wt. %, based on the total weight of the liquid crystal composition.

23. A liquid crystal shutter comprising a pair of mutually spaced substrate upon which are provided respective opposed alignment surfaces which are spaced apart, a layer of liquid crystal composition filling the space between the alignment surfaces, and electrodes to enable a switching voltage to be applied to the liquid crystal layer, wherein said liquid crystal composition comprises:

(1) an achiral host mixture comprising:
(a) at least 20% by weight, based on the total weight of the host mixture, of at least two difluorinated phenylpyrimidine (diFPYP) compounds capable of exhibiting an SmC phase, wherein the at least two difluorinated phenylpyrimidine compounds are of the general formula shown below:

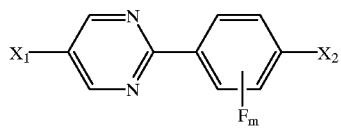

wherein $X_1$ and $X_2$ are independently selected from the group consisting of $(C_1–C_{12})$alkyl and $(C_1–C_{12})$alkoxy, and m is equal to 2, and (b) at least 10% by weight, based on the total weight of the host mixture, of at least one fluorinated terphenyl compound which is selected from the group consisting of difluorinated terphenyl compounds and trifluorinated terphenyl compounds and which enhances the phase of said mixture, wherein the total amount of (a) and (b) is at least 50% by weight based on the total weight of the host mixture, wherein component (b) is selected from difluorinated terphenyl compounds and trifluorinated terphenyl compounds represented by the general formula shown below:

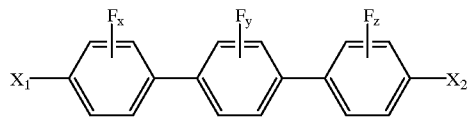

where $X_1$ and $X_2$ are independently selected from the group consisting of $(C_1-C_{12})$alkyl and $(C_1-C_{12})$alkoxy, and x is equal to 0, 1, 2, or 3, y is equal to 0, 1, 2, or 3, and z is equal to 0, 1, 2, or 3 with the proviso that the total of (x+y+z) is equal to 2 or 3; and (2) at least one chiral dopant in an amount of not more than 10% by weight of the total weight of the composition.

* * * * *